(12) United States Patent
Hickman et al.

(10) Patent No.: US 10,384,346 B2
(45) Date of Patent: Aug. 20, 2019

(54) COLLISION DETECTION, ESTIMATION, AND AVOIDANCE

(71) Applicant: Niantic, Inc., San Francisco, CA (US)

(72) Inventors: Ryan Michael Hickman, Sunnyvale, CA (US); Soohyun Bae, Los Gatos, CA (US)

(73) Assignee: NIANTIC, INC., San Francisco, CA (US)

( * ) Notice: Subject to any disclaimer, the term of this patent is extended or adjusted under 35 U.S.C. 154(b) by 4 days.

(21) Appl. No.: 15/699,444

(22) Filed: Sep. 8, 2017

(65) Prior Publication Data

US 2019/0077019 A1    Mar. 14, 2019

(51) Int. Cl.
| | | |
|---|---|---|
| *G06K 9/00* | (2006.01) |
| *B25J 9/16* | (2006.01) |
| *G06N 20/00* | (2019.01) |
| *G05D 1/02* | (2006.01) |
| *G06K 9/62* | (2006.01) |

(52) U.S. Cl.
CPC .......... *B25J 9/1666* (2013.01); *G05D 1/0214* (2013.01); *G06K 9/00671* (2013.01); *G06K 9/00791* (2013.01); *G06K 9/6256* (2013.01); *G06N 20/00* (2019.01)

(58) Field of Classification Search
CPC . B25J 9/1666; G05D 1/0214; G06K 9/00671; G06K 9/00791; G06K 9/6256; G06N 99/005
See application file for complete search history.

(56) References Cited

U.S. PATENT DOCUMENTS

| | | | |
|---|---|---|---|
| 2008/0009964 A1 | 1/2008 | Bruemmer et al. | |
| 2011/0235914 A1* | 9/2011 | Izhikevich | G06K 9/46 382/181 |
| 2014/0012415 A1 | 1/2014 | Benaim et al. | |
| 2015/0094852 A1* | 4/2015 | Laurent | G05D 1/00 700/250 |
| 2015/0283702 A1* | 10/2015 | Izhikevich | B25J 9/163 700/257 |
| 2015/0314443 A1* | 11/2015 | Yu | G06T 7/73 701/28 |
| 2016/0096270 A1* | 4/2016 | Ibarz Gabardos | B25J 9/163 700/253 |
| 2016/0096272 A1 | 4/2016 | Smith et al. | |

(Continued)

OTHER PUBLICATIONS

International Search Report and Written Opinion, PCT Application No. PCT/IB2018/056851, dated Dec. 7, 2018, 12 pages.

*Primary Examiner* — Ping Y Hsieh
(74) *Attorney, Agent, or Firm* — Fenwick & West LLP

(57) ABSTRACT

An example method involves obtaining a log of sensor data indicative of an environment during a prior time period, with the log of sensor data including a sequence of image frames, and determining that the log of sensor data relates to a collision involving a physical object in the environment at a particular time within the prior time period. The method also involves, responsive to determining that the log of sensor data relates to the collision, generating a training data set for the collision from the log of sensor data. The training data set for the collision may include multiple image frames of the sequence of image frames that are prior to an image frame in the sequence of image frames that corresponds to the particular time.

30 Claims, 8 Drawing Sheets

(56) References Cited

U.S. PATENT DOCUMENTS

| | | | | |
|---|---|---|---|---|
| 2017/0341642 A1* | 11/2017 | Suzuki | ............... | B60W 30/09 |
| 2018/0165959 A1* | 6/2018 | Leem | ............... | G06K 9/00791 |
| 2018/0196442 A1* | 7/2018 | Wang | ............... | G05D 1/0274 |
| 2018/0253973 A1* | 9/2018 | Yang | ............... | G08G 1/166 |

* cited by examiner

US 10,384,346 B2

COLLISION DETECTION, ESTIMATION, AND AVOIDANCE

FIELD

The present disclosure relates generally to machine learning, and more particularly, to generating training data sets for training a machine learning model and to performing collision estimation using a machine learning model.

BACKGROUND

When navigating a robotic device through an environment, it may be desirable to avoid collisions with physical objects in the environment. For example, when navigating a robotic device through an indoor environment, it may be desirable to avoid collisions with people, pets, and other moving objects.

In some cases, robotic devices are programmed to avoid collisions by acting in a reactive manner. For example, a robotic device may include an infrared proximity sensor and be programmed to stop or change directions whenever an object is detected within a particular range of the robotic device. Unfortunately, however, in some situations, the robotic device may react too slowly, causing the robotic device to collide with the object. In addition, when navigating within an environment, a robotic device operating in a reactive manner may be unable to estimate a trajectory of a moving object (or an object that could potentially move) and proactively take action to avoid colliding with the object. Improvements are therefore desired.

SUMMARY

In one example, a computer-implemented method is described. The computer-implemented method involves obtaining, by a computing device, a log of sensor data indicative of an environment during a prior time period, with the log of sensor data including a sequence of image frames. The computer-implemented method further involves determining, by the computing device, that the log of sensor data relates to a collision involving a physical object in the environment at a particular time within the prior time period. The computer-implemented method also involves, responsive to determining that the log of sensor data relates to the collision, generating, by the computing device, a training data set for the collision from the log of sensor data. The training data set for the collision includes multiple image frames of the sequence of image frames that are prior to an image in the sequence of image frames that corresponds to the particular time.

In another example, a computing device is described. The computing device includes at least one processor, memory, and program instructions stored in the memory that upon execution by the at least one processor cause the computing device to perform various functions. The functions include obtaining a log of sensor data indicative of an environment during a prior time period, with the log of sensor data including a sequence of image frames. The functions further include determining that the log of sensor data relates to a collision involving a physical object in the environment at a particular time within the prior time period. The functions also include, responsive to determining that the log of sensor data relates to the collision, generating a training data set for the collision from the log of sensor data. The training data set for the collision includes multiple image frames of the sequence of image frames that are prior to an image frame in the sequence of image frames that corresponds to the particular time.

In another example, a non-transitory computer readable medium having stored therein instructions, that when executed by a computing device, cause the computing device to perform functions is described. The functions include obtaining a log of sensor data indicative of an environment during a prior time period, with the log of sensor data including a sequence of image frames. The functions further include determining that the log of sensor data relates to a collision involving a physical object in the environment at a particular time within the prior time period. The functions also include, responsive to determining that the log of sensor data relates to the collision, generating a training data set for the collision from the log of sensor data. The training data set for the collision includes multiple image frames of the sequence of image frames that are prior to an image frame in the sequence of image frames that corresponds to the particular time.

The features, functions, and advantages that have been discussed can be achieved independently in various examples or may be combined in yet other examples further details of which can be seen with reference to the following description and figures.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying figures, wherein:

DETAILED DESCRIPTION

Figure 1:
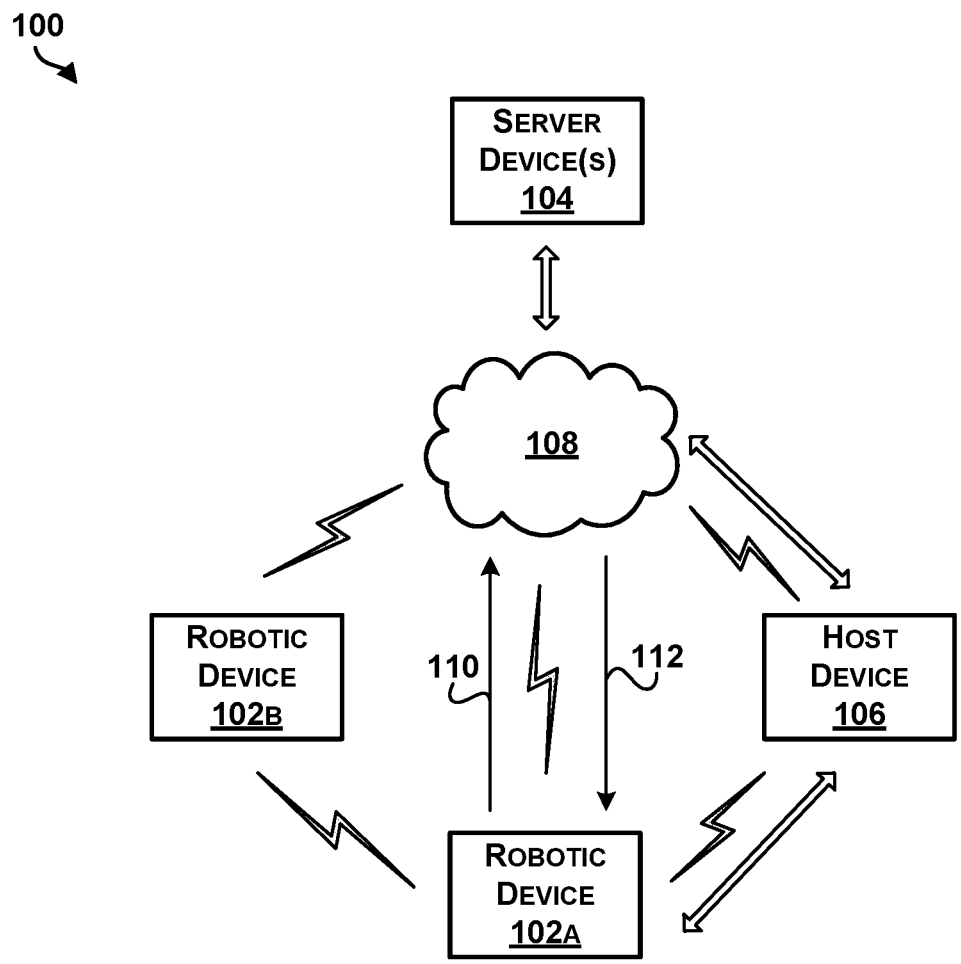
FIG. 1 illustrates an example system, according to an example embodiment.

Disclosed examples will now be described more fully hereinafter with reference to the accompanying figures, in which some, but not all of the disclosed examples are shown. Indeed, several different examples may be provided and should not be construed as limited to the examples set forth herein. Rather, these examples are provided so that this disclosure will be thorough and complete and will fully convey the scope of the disclosure to those skilled in the art.

Described herein are systems and methods for generating training data sets for training machine learning models. Within examples, a robotic device may detect a collision involving a physical object in an environment, and responsively collect and package data pertaining to the collision as a training data set for a machine learning model. After training up the machine learning model using the training data set and other training data sets, the robotic device (or another robotic device) can then use the model to predict when future collisions will occur and to take preventive actions to avoid colliding with physical objects.

One example method involves obtaining, by a computing device, a log of sensor data indicative of an environment during a prior time period. For instance, a robotic device navigating in the environment may record and store a log of sensor data that includes a sequence of image frames corresponding to the prior time period, and provide the log of sensor data to the computing device. The method also involves determining, by the computing device, that the log of sensor data relates to a collision involving a physical object in the environment at a particular time within the prior time period. For example, the computing device may determine that the collision is a physical collision between the physical object and the robotic device. And responsive to determining that the log of sensor data relates to the collision, the computing device can then generate a training data set for the collision from the log of sensor data. The training data set may include multiple image frames of the sequence of image frames that are prior to an image frame in the sequence of image frames that corresponds to the particular time.

In some examples, a robotic device may have a red, green, blue, distance (RGBD) camera that captures RGBD images, and the log of sensor data may include a sequence of RGBD image frames. With these examples, the training data set for the collision may include RGDB image frames leading up to the collision. For instance, if a moving object (such as a bouncing ball) collides with the robotic device and triggers generation of a training data set, the training data set may include RGBD image frames depicting the motion of the object.

A computing device can determine that a log of sensor data relates to a collision in various ways. For instance, as described further below, a computing device may determine that accelerometer data recorded by a robotic device is indicative of a collision between a physical object and the robotic device. Similarly, a computing device may determine that contact sensor data recorded by the robotic device is indicative of a collision between a physical object and the robotic device. Other techniques for recognizing collisions and triggering generation of training data sets are also contemplated and disclosed herein.

Further, in some examples, virtual collisions, such as a collision between a physical object and a software robot in the form of an augmented reality character may also trigger generation of training data sets. For instance, an augmented reality graphic may be positioned at a particular position in an environment, and if a computing device determines that a physical object moves to the particular position, the computing device may responsively generate a training data set for the collision.

Advantageously, the systems and methods disclosed herein may facilitate generating training data sets for a machine learning model without requiring human labelers to post-process logs of sensor data and label portions of sensor data as collisions or to trigger generation of training data sets in real-time when collisions occur.

Various other features of these systems and methods are described hereinafter with reference to the accompanying figures.

Referring now to FIG. 1, an example system 100 is illustrated. In particular, FIG. 1 illustrates an example system 100 for collision detection and/or collision estimation. As used herein, collision detection refers to the process of determining that a collision involving at least one moving object in an environment has occurred. In line with the discussion above, collision detection is useful for collecting data related to collisions and generating training data sets for training a machine learning model. Collision estimation, on the other hand, refers to the process of predicting that a robot, such as a robotic device or a software robot, may collide with a physical object. The physical object may be stationary or movable. For instance, the physical object may be a piece of furniture or a physical structure in an environment, such as a wall, a floor, a cabinet, stairs, etc. Alternatively, the physical object may be a ball, toy, or article of clothing. In some cases, collision estimation may involve estimating a trajectory of a moving object and/or the robot using a machine learning model.

As shown in FIG. 1, system 100 includes robotic devices 102a, 102b, at least one server device 104, a host device 106, and a communications network 108.

Robotic devices 102a, 102b may be any type of device that has at least one sensor and is configured to record sensor data in accordance with the embodiments described herein. In some cases, the robotic devices 102a, 102b, may also include locomotion capability (e.g., drive systems) that facilitate moving within an environment.

As shown in FIG. 1, robotic device 102a may send data 110 to and/or receive data 112 from the server device 104 and/or host device 106 via communications network 108. For instance, robotic device 102a may send a log of sensor data to the server device 104 via communications network 108. Additionally or alternatively, robotic device 102a may receive machine learning model data from server device 104. Similarly, robotic device 102a may send a log of sensor data to host device 106 via communications network 108 and/or receive machine learning model data from host device 106. Further, in some cases, robotic device 102a may send data to and/or receive data directly from host device 106 as opposed to via communications network 108.

Server device 104 may be any type of computing device configured to carry out the computing device operations described herein. For example, server device 104 can include a remote server device and may be referred to as a "cloud-based" device. In some examples, server device 104 may include a cloud-based server cluster in which computing tasks are distributed among multiple server devices. In line with the discussion above, server device 104 may be configured to send data 112 to and/or receive data 110 from robotic device 102a via communications network 108. Server device 104 can include a machine learning server device that is configured to train a machine learning model.

Like server device 104, host device 106 may be any type of computing device configured to carry out the computing device operations described herein. However, unlike server device 104, host device 106 may be located in the same environment (e.g., in the same building) as robotic device 102a. In one example, robotic device 102a may dock with host device 106 to recharge, download, and/or upload data.

Although robotic device 102a is capable of communicating with server device 104 via communications network 108 and communicating with host device 106, in some examples, robotic device 102a may carry out the computing device operations described herein. For instance, robotic device 102a may include an internal computing system arranged to carry out the computing device operations described herein.

In some examples, robotic device 102a may wirelessly communicate with robotic device 102b via a wireless interface. For instance, robotic device 102a and robotic device 102b may both operate in the same environment, and share data regarding the environment from time to time.

The communications network 108 may correspond to a local area network (LAN) a wide area network (WAN), a corporate intranet, the public internet, or any other type of network configured to provide a communications path between devices. The communications network 108 may also correspond to a combination of one or more LANs, WANs, corporate intranets, and/or the public Internet.

Figure 2:
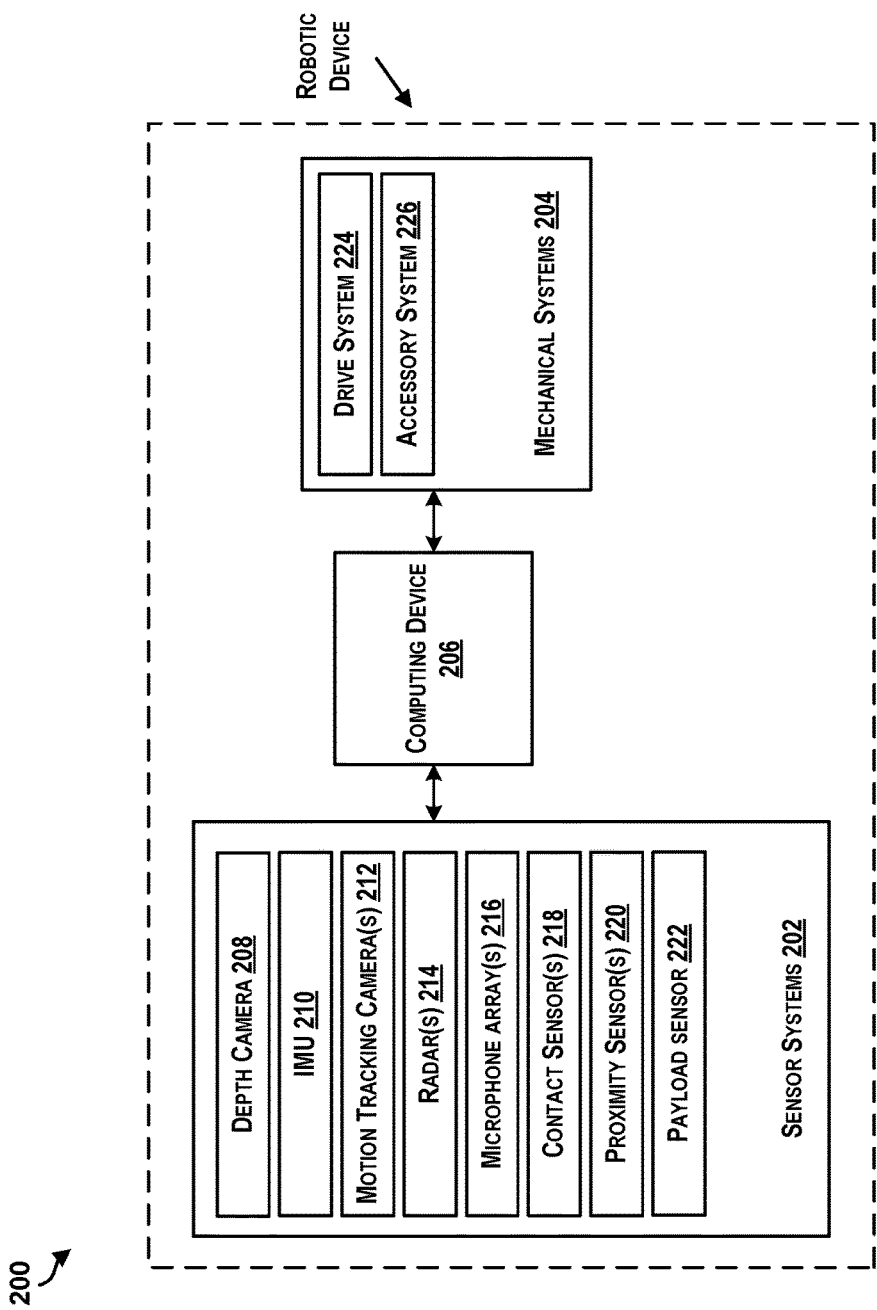
FIG. 2 illustrates an example robotic device, according to an example embodiment.

FIG. 2 illustrates an example robotic device 200, according to an example embodiment. Robotic device 200 may represent any robotic device depicted in any of the drawings herein. FIG. 2 shows some of the components that could be included in a robotic device arranged to operate in accordance with the embodiments described herein.

As shown in FIG. 2, robotic device 200 includes sensor systems 202, mechanical systems 204, and a computing device 206. In FIG. 2, sensor systems 202 are shown to include a number of sensors such as a depth camera 208, an inertial measurement unit (IMU) 210, one or more motion tracking cameras 212, one or more radars 214, one or more microphone arrays 216, one or more contact sensors 218, one or more proximity sensors 220, and a payload sensor 222.

Depth camera 208 may be configured to recover information regarding depth of objects in an environment, such as three-dimensional (3D) characteristics of the objects. For example, depth camera 208 may be an RGB-infrared (RGB-IR) camera that is configured to capture one or more images of a projected infrared pattern, and provide the images to a processor that uses various algorithms to triangulate and extract 3D data and outputs one or more RGBD images. The infrared pattern may be projected by a projector that is integrated with depth camera 208. Alternatively, the infrared pattern may be projected by a projector that is separate from depth camera 208 (not shown).

IMU 210 may be configured to determine a velocity and/or orientation of the robotic device. In one example, IMU may include a 3-axis gyroscope, a 3-axis accelerometer, a 3-axis compass, and one or more processors for processing motion information.

Motion tracking camera 212 may be configured to detect and track movement of objects by capturing and processing images (e.g., RGB-IR images). In some instances, motion tracking cameras 212 may include one or more IR light emitting diodes (LEDs) that enable detection in low-luminance lighting conditions. Motion tracking cameras 212 may include a wide field of view (FOV), such as a 180 degree FOV. In one example configuration, robotic device 200 may include a first motion tracking camera configured to capture images on a first side of robotic device 200 and a second motion tracking camera configured to capture images on an opposite side of robotic device 200.

Radar 214 may include an object-detection system that uses electromagnetic waves to determine a range, angle, or velocity of objects in an environment. Radar 214 may operate by firing laser pulses out into an environment, and measuring reflected pulses with one or more sensors. In one example, radar 214 may include a solid-state millimeter wave radar having a wide FOV, such as a 150 degree FOV.

Microphone array 216 may include a number of microphones operating in tandem to perform one or more functions, such as recording audio data. In one example, microphone array 216 may be configured to locate sources of sounds using acoustic source localization.

Contact sensor 218 may be configured to provide a signal when robotic device 200 contacts an object. For instance, contact sensor 218 may be a physical bump sensor on an exterior surface of robotic device 200 that provides a signal when contact sensor 218 comes into contact with an object.

Proximity sensor 220 may be configured to detect a presence of objects within a range of robotic device 200. For instance, proximity sensor 220 can include an infrared proximity sensor. In one example, robotic device 200 may include multiple proximity sensors, with each proximity sensor arranged to detect objects on different sides of robotic device 200 (e.g., front, back, left, right, etc.).

Payload sensor 222 may be configured to measure a weight of a payload carried by robotic device 200. For instance, payload sensor 222 can include a load cell that is configured to provide an electrical signal that is proportional to a force being applied to platform or other surface of robotic device 200.

As further shown in FIG. 2, mechanical systems 204 are shown to include a drive system 224 and accessory system 226. Drive system 224 may include one or more motors, wheels, and other components that can be controlled to cause robotic device 200 to move through an environment (e.g., move across a floor). In one example, drive system 224 may include an omnidirectional drive system that can be controlled to cause robotic device 200 to drive in any direction.

Accessory system 226 may include one or more mechanical components configured to facilitate performance of an accessory task. As one example, accessory system 226 may include a motor and a fan configured to facilitate vacuuming. For instance, the electric motor may cause the fan to rotate in order to create suction and facilitate collecting dirt, dust, or other debris through an intake port. As another example, the accessory system may include one or more actuators configured to vertically raise a platform or other structure of robotic device 200, such that any objects placed on top of the platform or structure are lifted off of the ground. In one example, lift system 226 may be configured to lift a payload of around 10 kilograms. Other examples are also possible depending on the desired activities for the robotic device 200.

Computing device 206 may include various computing components configured to control sensor systems 202 and mechanical systems 204. For instance, computing device 206 may include a system on a chip (SOC) that integrates various components.

Figure 3:
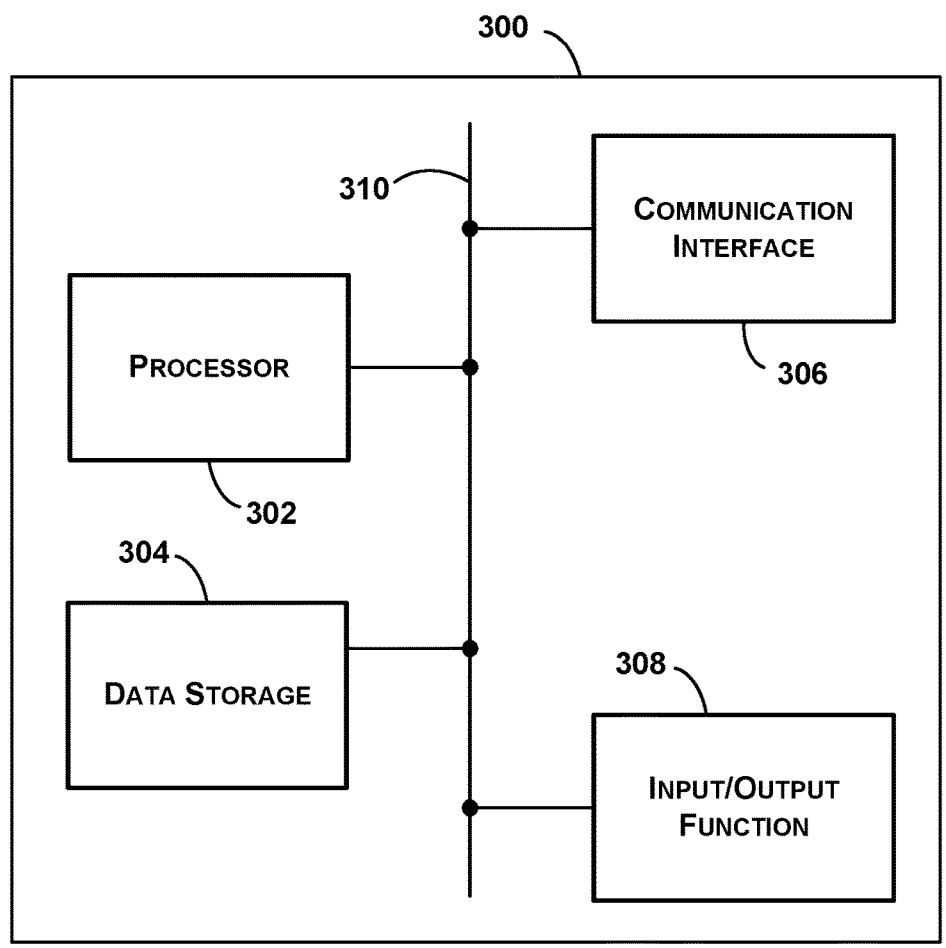
FIG. 3 illustrates an example computing device, according to an example embodiment.

By way of example, FIG. 3 illustrates an example computing device 300. Computing device 300 may represent any computing device, server device, or host device depicted in any of the drawings herein. FIG. 3 shows some of the functional components that could be included in a computing device arranged to operate in accordance with the embodiments herein. In this example, computing device 300 includes a processor 302, a data storage 304, a communication interface 306, and an input/output function 308, all of which may be coupled by a system bus 310 or a similar mechanism.

Processor 302 can include one or more CPUs, such as one or more general purpose processors and/or one or more dedicated processors (e.g., application specific integrated circuits (ASICs), digital signal processors (DSPs), network processors, etc.). For example, processor 302 can include a tensor processing unit (TPU) for training and/or inference of machine learning models.

Data storage 304, in turn, may comprise volatile and/or non-volatile data storage and can be integrated in whole or in part with processor 302. Data storage 304 can hold program instructions, executable by processor 302, and data that may be manipulated by these instructions to carry out the various methods, processes, or operations described herein. Alternatively, these methods, processes, or operations can be defined by hardware, firmware, and/or any combination of hardware, firmware and software. By way of example, the data in data storage 304 may contain program instructions, perhaps stored on a non-transitory, computer-readable medium, executable by processor 302 to carry out any of the methods, processes, or operations disclosed in this specification or the accompanying drawings.

Communication interface 306 may take the form of a wireline connection, such as an Ethernet connection. Communication interface 306 may also take the form of a wireless connection, such as IEEE 802.11 (Wifi), BLUETOOTH®, or a wide-area wireless connection. However, other forms of physical layer connections and other types of standard or proprietary communication protocols may be used over communication interface 306.

Input/output function 308 may facilitate user interaction with computing device 300. Input/output function 308 may comprise multiple types of input devices, such as a keyboard, a mouse, a touchscreen, a microphone, and so on. Similarly, input/output function 308 may comprise multiple types of output devices, such as a screen, monitor, printer, or one or more LEDs. Additionally or alternatively, computing device 300 may support remote access from another device, via communication interface 306 or via another interface (not shown), such as a universal serial bus (USB) or high-definition multimedia interface (HDMI) port.

Figure 4:
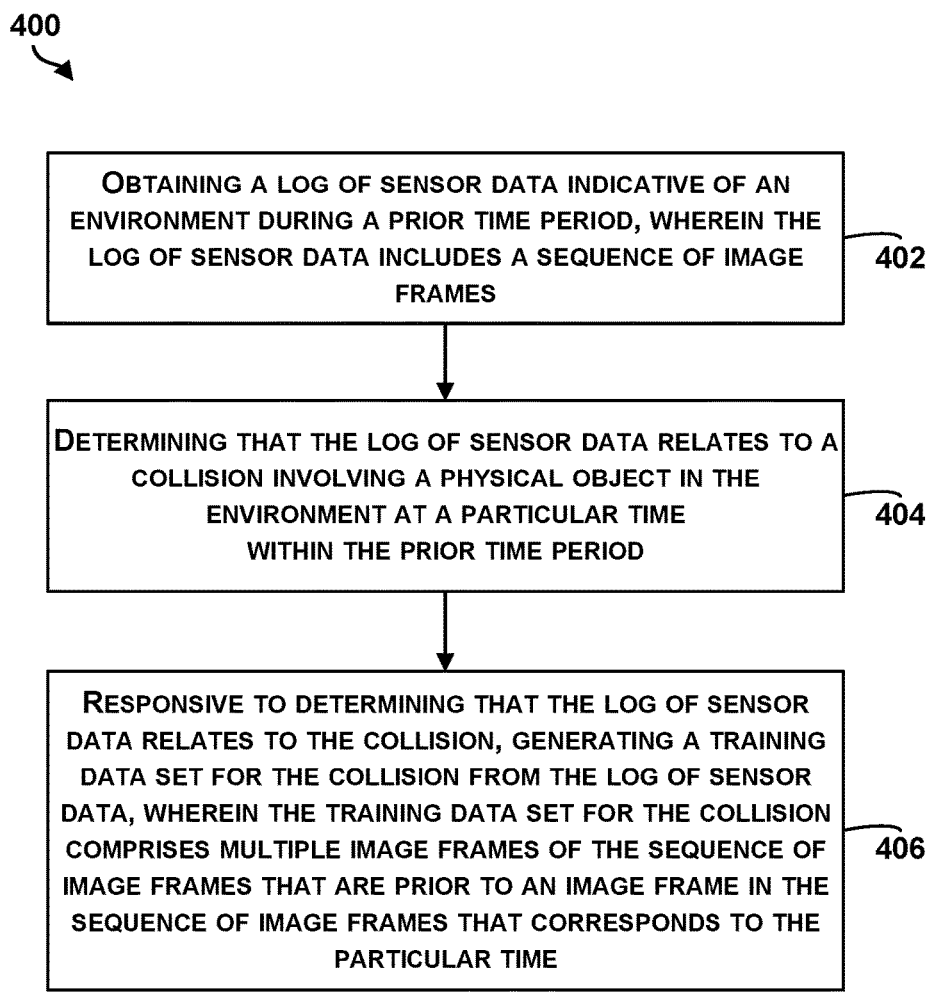
FIG. 4 shows a flowchart of an example method, according to an example embodiment.

FIG. 4 shows a flowchart of an example method 400 for collision detection. Method 400 shown in FIG. 4 presents an embodiment of a method that, for example, could be carried out by a computing device, such as any of the computing devices depicted in any of the drawings herein. It should be understood that for this and other processes and methods disclosed herein, flowcharts show functionality and operation of one possible implementation of present embodiments. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 402, the method 400 includes obtaining a log of sensor data indicative of an environment during a prior time period, with the log of sensor data including a sequence of image frames. For instance, the environment may be the interior of a building, such as a house, and the image frames may be RGBD image frames.

In some examples, the log of sensor data may include sensor data captured by a robotic device. For instance, the log of sensor data may include images captured by one or multiple cameras of a robotic device. In addition, the log of sensor data may include sensor data captured by other sensors of the robotic device, such as IMUs, microphone arrays, contact sensors, payload sensors, or proximity sensors. In some instances, the robotic device may record the sensor data and provide the log of sensor data to another computing device that carries out portions of the method 400. Alternatively, in other instances, the robotic device may obtain the log of sensor data using sensors of the robotic device and store the log of sensor data in a data buffer. With this configuration, as new sensor data is obtained, the robotic device may replace old or stale sensor data in the data buffer with the new sensor data. For example, the data buffer may be continually or periodically updated such that the data buffer stores sensor data obtained by the robotic device during the previous thirty seconds.

In some examples, the log of sensor data may include images captured by a mobile computing device, such as a smartphone, tablet, wearable computing device, handheld camera computing device, etc. In addition, the log of sensor data may include sensor data captured from other sensors of the mobile computing device, such as IMUs or microphone arrays. In some instances, the mobile computing device may record the sensor data and provide the log of sensor data to another computing device that carries out portions of the method 400. Alternatively, in other instances, the mobile computing device may obtain the log of sensor data using sensors of the mobile device and also carry out other functions of the method 400.

At block 404, the method 400 includes determining, using the log of sensor data, that the log of sensor data relates to a collision involving a physical object in the environment at a particular time within the prior time period. The physical object could take various forms. For instance, the physical object could be a ball, a pet, or a human. Or the physical object could be an item being transported (e.g., carried) by a robotic device. As another example, the physical object could be a wall, floor, or piece of furniture.

In one example, determining that the log of sensor data relates to a collision may involve determining that the collision is a physical collision between the physical object and a robotic device. This determination can be made in various ways. For instance, a computing device may obtain accelerometer data for at least part of the prior time period, and the computing device may determine that the accelerometer data is indicative of a collision between the physical object and the robotic device at a particular time. For instance, a magnitude of acceleration that exceeds a threshold may be indicative of a sudden change in velocity due to a physical collision, and a computing device may analyze the accelerometer data to detect such a magnitude at a particular time. One example of a physical collision between a robotic device and a physical object is a physical collision between the robotic device and the floor due to the robotic device falling over or off of a ledge.

Alternatively, determining that the collision is a physical collision between the physical object and the robotic device may involve obtaining contact sensor data for at least part of the prior time period, and determining that the contact sensor data is indicative of a collision between the physical object and the robotic device. For instance, the contact sensor may output a signal when the contact sensor contacts another object, and a computing device may recognize such a signal. In one example, the contact sensor may output a signal when a robotic device bumps into a wall.

In some cases, determining that the collision is a physical collision between the physical object and the robotic device may involve determining that an object being carried or transported by the robotic device has been dropped or fallen off. For instance, the log of sensor data may include payload data indicative of a payload of the robotic device (e.g., a weight of the payload), and a computing device may detect an unexpected decrease in the payload. The payload may suddenly decrease if the robotic device collides with a physical object or falls over. Hence, the computing device may interpret the decrease as an indication of a possible collision.

In other examples, the collision may be a virtual collision. By way of example, determining that the log of sensor data relates to a collision may involve determining that the collision is a virtual collision between the physical object and a virtual boundary surrounding a robotic device or a virtual collision between a virtual boundary surrounding the physical object and the robotic device. This determination could also be made in various ways. For instance, a computing device may obtain proximity sensor data for at least part of the prior time period, and the computing device may determine that the proximity sensor data is indicative of a distance between the physical object and the robotic device transitioning from being more than threshold distance to being less than the threshold distance. The threshold distance may be the same as a distance of the virtual boundary.

Similarly, in some examples, the collision may be a virtual collision between the physical object and a software robot in the form of an augmented reality graphic that is superimposed on a view of the environment. A computing device could detect such a collision by processing depth information from depth images. For instance, the sequence of image frames of the log of sensor data could include depth information indicative of a distance to the physical object, and the computing device could determine, based on the depth information, that (i) the physical object moved from a first position to a second position and (ii) the second position overlaps with a position of the augmented reality graphic. Any computing device could generate and augmented reality graphic and detect such a collision, such as a mobile computing device (e.g., smartphone or tablet) or wearable computing device (e.g., head-mounted display).

Likewise, the collision may be a virtual collision between the physical object and a software robot in the form of an augmented reality graphic that is rendered during a simulation. For instance, a computing device could generate a simulation of a software robot moving through the environment using the log of sensor data. In the simulation, the software robot may take a same path or a different path than the path taken by a robotic device that captured the log of sensor data. If the software robot takes a different path, the different path may involve a virtual collision between the software robot and a physical object in the environment, and the computing device can detect the virtual collision.

At block 406, the method 400 includes responsive to determining that the log of sensor data relates to the collision, generating a training data set for the collision from the log of sensor data. The training data set may include multiple image frames of the sequence of image frames that are prior to an image frame in the sequence of image frames that corresponds to the particular time. As an example, the training data set may include the five most recent image frames leading up to the image frame that corresponds to the particular time, such that the training data set depicts motion of the physical object leading up to the collision. For instance, the multiple image frames may include depth data for one or more pixels, such that the training data set includes depth data indicative of any movement of the physical object prior to the collision.

In some cases, the training data set may also include other forms of sensor data. Generally, when the log of sensor data includes data from multiple sensors, any of the data from the multiple sensors may be packaged into the training data set. For instance, when the log of sensor data includes payload data, generating the training data set may include generating the training data set to further include the payload data. Likewise, when the log of sensor data includes velocity data for a robotic device, generating the training data set may include generating the training data set to further include the velocity data. As another example, the log of sensor data may include room information that identifies a type of room (e.g., living room, kitchen, bedroom, etc.), and generating the training data set may include generating the training data set to further include the room information.

Advantageously, training data sets generated using the method 400 can be used to train a machine learning model for collision estimation. In some cases, the computing device that carries out the method 400 may train the machine learning model using the training data set and possibly other training data sets that are also generated using the method 400 or generated using other techniques. For instance, a computing device of a robotic device may carry out the method 400 multiple times and may then train a machine learning model using the generated training data sets. In other cases, the computing device that carries out the method 400 may transmit the generated training data set to another computing device that may then train the machine learning model. For instance, the computing device that carries out the method 400 may transmit to a machine learning server at least one file representing the generated training data set, and the machine learning server may carry out the training.

Figure 5:
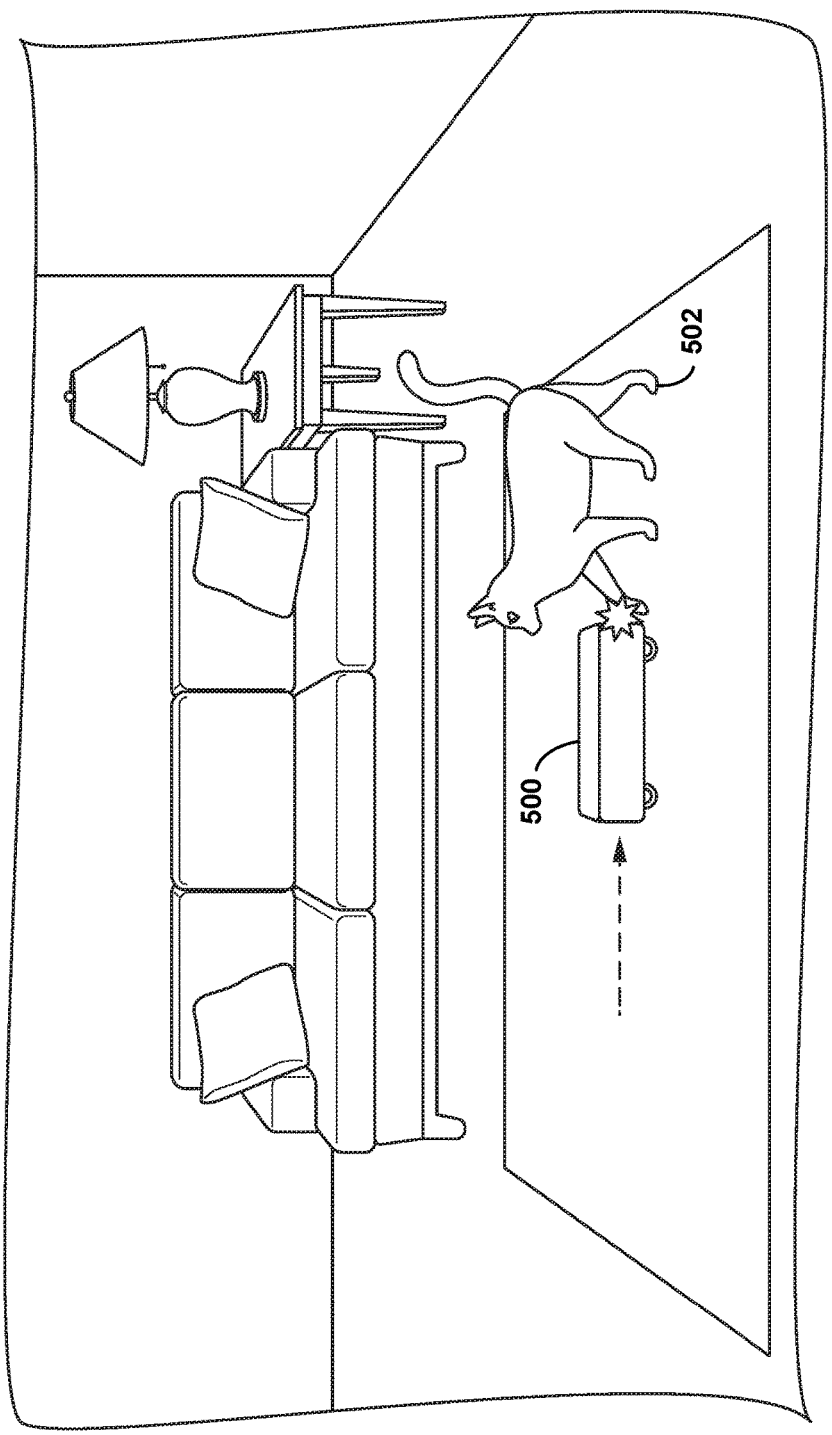
FIG. 5 is a conceptual illustration of a collision involving a physical object in an environment, according to an example embodiment.

FIG. 5 is a conceptual illustration of a collision involving a physical object in an environment, according to an example embodiment. As shown in FIG. 5, a robotic device 500 may be operating in a living room. For instance, robotic device 500 may be driving across a floor of the living room. While driving across the floor, robotic device 500 may obtain sensor data indicative of the environment. For example, robotic device 500 may capture a sequence of image frames and record IMU data.

As further shown in FIG. 5, robotic device 500 may unintentionally bump into a cat 502. A computing device of robotic device 500 may detect that robotic device 500 has bumped into cat 502 and, responsively, trigger generation of a training data set. By way of example, the computing device may package portions of the sensor data obtained by robotic device 500 before bumping into cat 502 together as a training data set. In one instance, the training data set may include a sequence of RGBD image frames depicting motion of cat 502 before the collision with robotic device 500.

Figure 6:
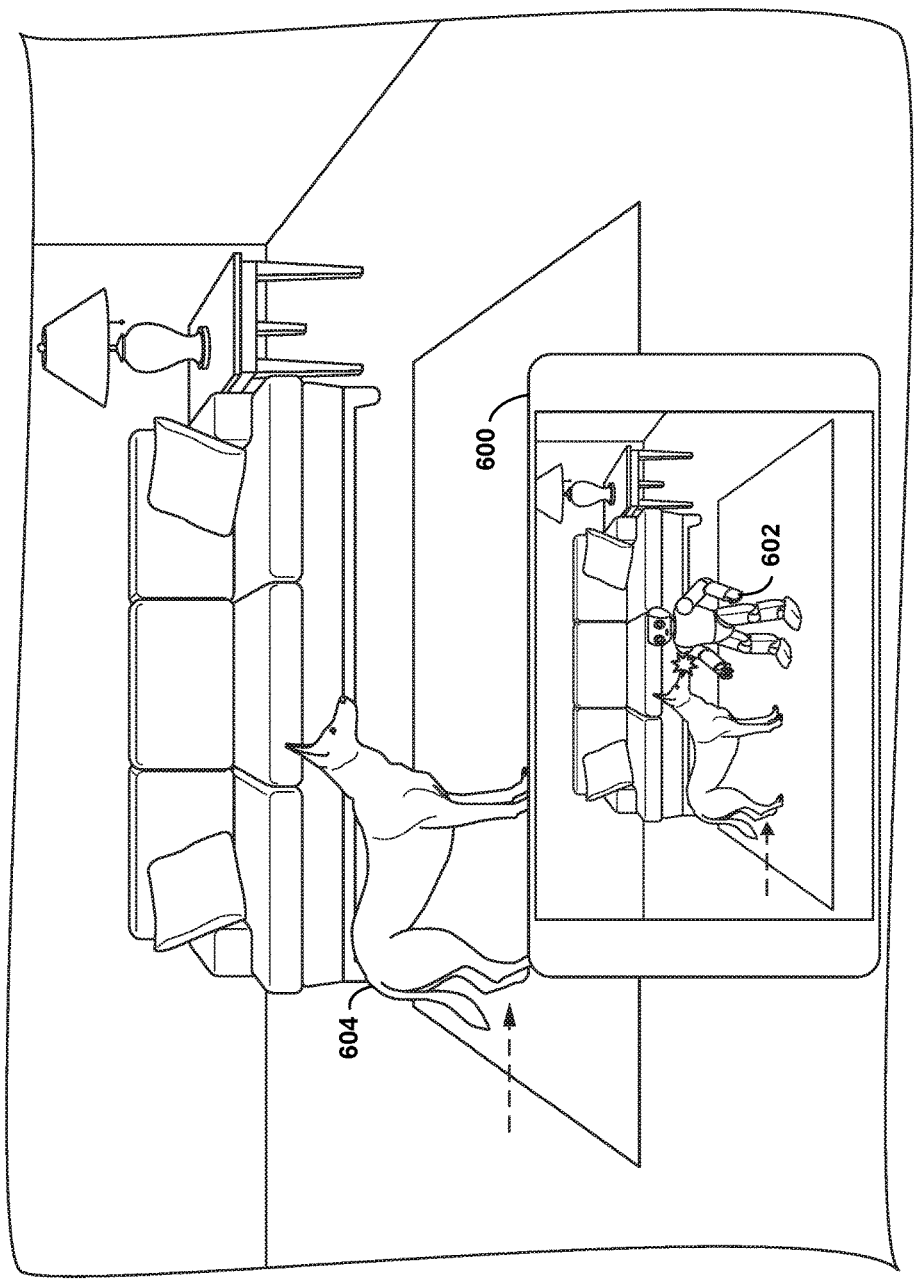
FIG. 6 is another conceptual illustration of a collision involving a physical object in an environment, according to an example embodiment.

FIG. 6 is another conceptual illustration of a collision involving a physical object in an environment, according to an example embodiment. As shown in FIG. 6, a computing device 600 may capture and display a view of a living room. In addition, computing device 600 may superimpose an augmented reality graphic 602 on the view of the living room. For instance, augmented reality graphic 602 may be an animated character that moves around within a virtual representation of the living room.

As further shown in FIG. 6, augmented reality graphic 602 is located at a particular position within the virtual representation of the living room. Computing device 600 may detect and track motion of objects in the living room. For instance, computing device 600 may detect that an object, namely, a dog 604, is moving across the living room. In addition, computing device 600 may determine a 3D position of dog 604 within the virtual representation of the living room. For instance, computing device 600 may obtain RGBD image frames using a depth camera and determine the 3D position of dog 604 by processing the RGBD image frames.

Furthermore, computing device 600 may determine that dog 604 has moved from a first position that does not overlap with a position of augmented reality graphic 602 to a second position that does overlap with the position of augmented reality graphic 602. In one example, computing device 600 may determine that the second position of dog 604 overlaps with the position of augmented reality graphic 602 by comparing a 3D position of dog 604 within the virtual representation of the environment to a 3D position of augmented reality graphic 602 within the virtual representation of the environment. For instance, computing device 600 may determine a 2D or 3D distance between a centroid of dog 604 and a centroid of augmented reality graphic 602, and determine that the 3D position of dog 604 overlaps with the 3D position of augmented reality graphic 602 based on the determined distance being less than a threshold.

In response to detecting motion of dog 604 from a position that does not overlap with a position of augmented reality graphic 602 to a position that does overlap with the position of augmented reality graphic 602, computing device 600 may trigger generation of a training data set. By way of example, computing device 600 may package together as a training data set one or more RGBD image frames depicting motion of dog 604 from the first position to the second position.

Other techniques for detecting collisions between augmented reality graphic 602 and dog 604 are also possible. For instance, in gaming, some game engines have colliders that provide collision detection for known objects in a scene. Colliders assign bodies to objects in a scene (e.g., bounding spheres, meshes, or catch-all 3D bodies). If a body of a first object comes into contact with a body of a second object, the collider generates a collision event.

To allow the collider to function in an augmented reality scene, a computing device may estimate the location, size, and pose of real world objects, so that the real world objects can be represented with appropriate bodies in a 3D representation of the environment along with the augmented reality graphic. The computing device could estimate the location, size, and pose of real world objects using varying levels of detail. As one example, the computing device could define a body for an object using points on a surface of the object that are determined via a depth camera. As another example, the computing device could estimate a bounding box for one or more objects in a scene. The bounding box could be 2D or 3D. As still another example, the computing device could estimate a 3D shape of an object. For instance, the computing device may query a database to determine a 3D model of the object, or estimate a 3D model of an object using machine learning.

As discussed above, training data sets generated using the method 400 of FIG. 4 and/or training data sets generated using other techniques can be used to train a machine learning model for collision estimation. Training a machine learning model on training data sets that include data related to movement of physical objects may involve finding patterns in the training data sets that map input sensor data to object trajectories or velocities. After the machine learning model is trained, a computing device may use the machine learning model to predict how a physical object will move based on input data corresponding to the physical object.

Figure 7:
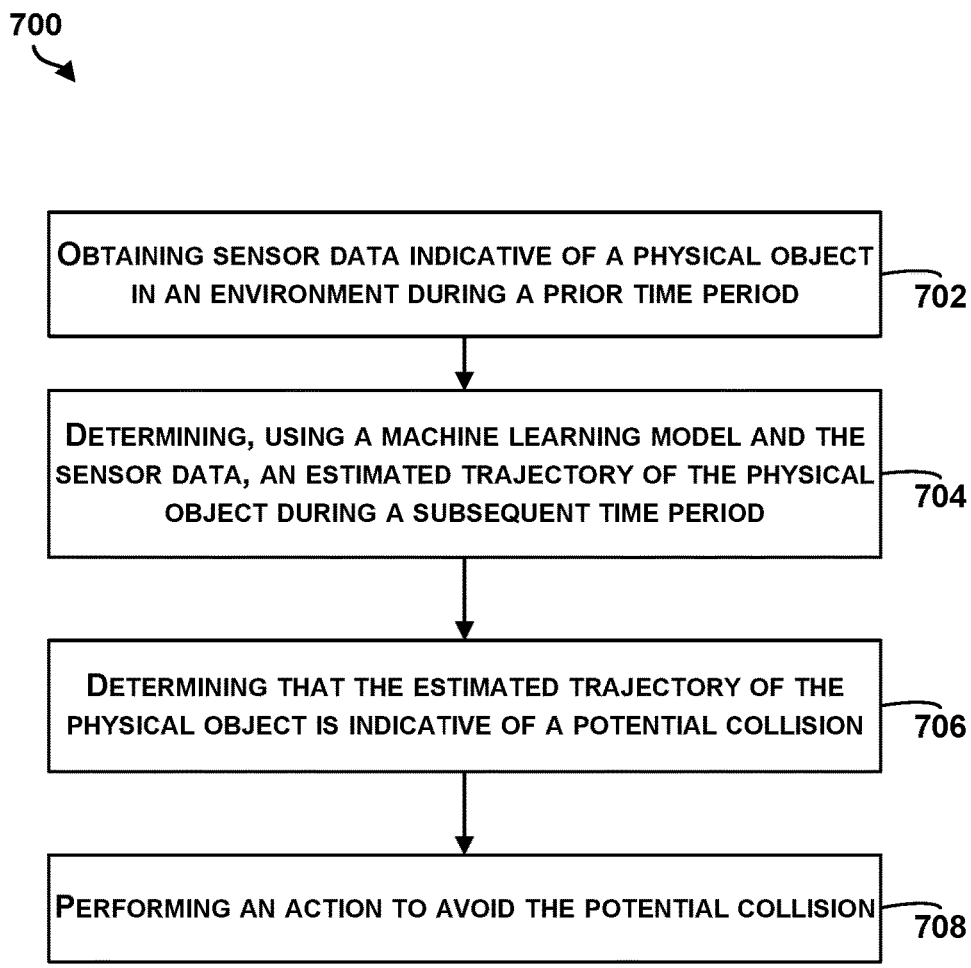
FIG. 7 shows a flowchart of another example method, according to an example embodiment.

FIG. 7 shows a flowchart of an example method 700 for collision estimation. Method 700 shown in FIG. 7 presents an embodiment of a method that, for example, could be carried out by a computing device, such as any of the computing devices depicted in any of the drawings herein.

At block 702, the method 700 includes obtaining sensor data indicative of a physical object in an environment during a prior time period. In one example, the sensor data may include a sequence of image frames. For instance, the sensor data may include a sequence of RGBD image frames depicting motion of the physical object. The sensor data may also include contextual data, such as a type of room or time of day.

At block 704, the method 700 includes determining, using a machine learning model and the sensor data, an estimated trajectory of the physical object during a subsequent time period. For instance, a computing device may provide the sensor data as input to a machine learning model, and receive as an output an estimated trajectory of the physical object. The estimated trajectory may include an estimated position of the physical object over time. In some cases, the computing device may derive information corresponding to the physical object, and provide the derived information to the machine learning model as input. By way of example, the computing device may determine dimensions of the physical object, such as a height, depth, and speed of the moving object, and provide the dimensions and speed as input to the machine learning model. In some instances, contextual data such as a type of room or time of day may also be provided as input to the machine learning model.

At block 706, the method 700 includes determining that the estimated trajectory of the physical object is indicative of a potential collision. In one example, determining that the estimated trajectory of the physical object is indicative of a potential collision may involve comparing the estimated trajectory of the physical object to an estimated trajectory of a robot, such as a robotic device or a software robot, and determining that the estimated trajectory of the physical object intersects with the estimated trajectory of the robot. For instance, a computing device may determine that the physical object and the robot may collide if the physical object moves in accordance with the estimated trajectory of the physical object and the robot moves in accordance with the estimated trajectory of the robot.

At block 708, the method 700 includes performing an action to avoid the potential collision. For example, the potential collision at block 706 may be a potential collision between the physical object and a robotic device, and preforming the action may involve providing a command to a drive system of the robotic device (e.g., providing a command to stop, reverse, or follow a particular trajectory to avoid colliding with the physical object). As another example, the potential collision at block 706 may be a potential collision between the physical object and a software robot in the form of an augmented reality graphic that is rendered on a view of the environment, and performing the action may involve adjusting a position of the augmented reality graphic (e.g., moving the augmented reality graphic to a new position or causing the augmented reality graphic to briefly jump out of the way).

Advantageously, using the method 700, a computing device can detect a potential collision and take action to avoid the potential collision. For instance, a computing device of a robotic device can process sensor data obtained by the robotic device and cause the robotic device to take action to avoid the potential collision.

Figure 8:
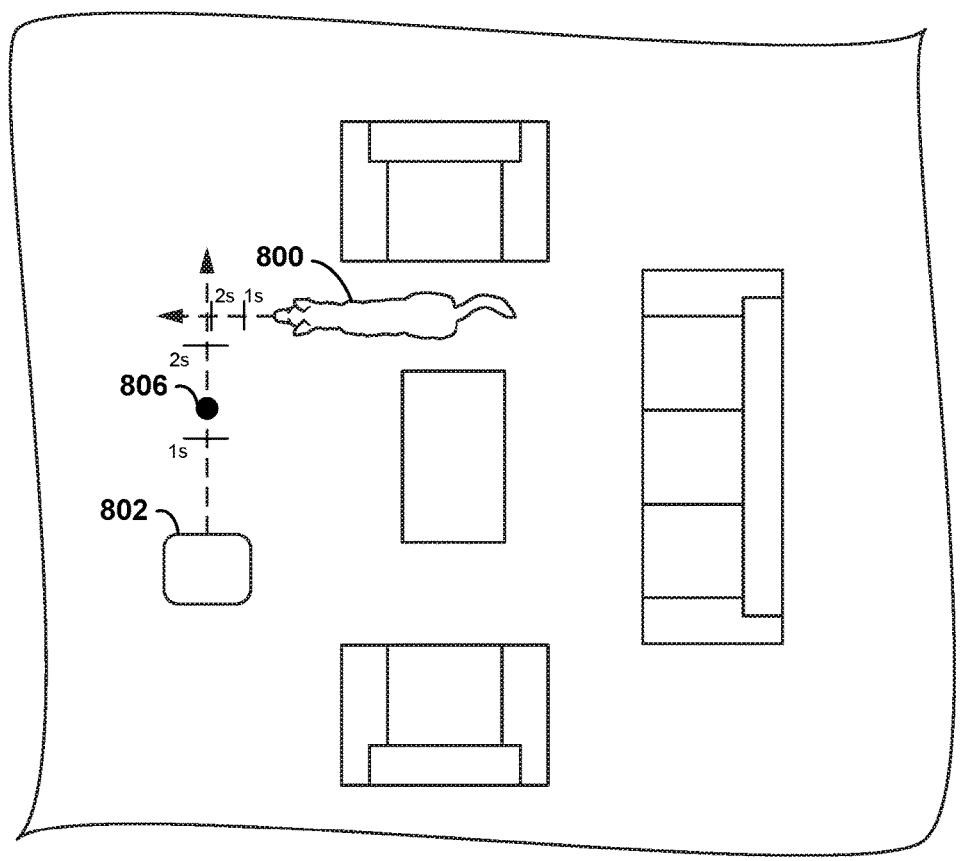
FIG. 8 is a conceptual illustration of collision estimation and avoidance, according to an example embodiment.

FIG. 8 is a conceptual illustration of collision estimation and avoidance, according to an example embodiment. As shown in FIG. 8, a physical object, namely, a dog 802, may be moving through a room in a building. While a robotic device 804 is moving across the room, a computing device of robotic device 804 may obtain sensor data indicative of dog 802. For instance, computing device may obtain sensor data including one or more image frames that depict motion of dog 802.

Computing device may then determine an estimated trajectory of dog 802 using a machine learning model. As shown in FIG. 8, the estimated trajectory of dog 802 may include an estimated position of dog 802 in one second, estimated position of dog 802 in two seconds, etc.

Further, computing device may compare the estimated trajectory of dog 802 to an estimated trajectory of robotic device 804 and determine that robotic device may collide with dog 802 in about two seconds. Responsive to the determination, the computing device may cause robotic device 804 to stop at a position 806 so that robotic device 804 avoids unintentionally colliding with dog 802. Alternatively, computing device may cause robotic device 804 to stop at position 806 and then reverse or change directions (not shown).

In another example, training data sets generated using the method 400 of FIG. 4 and/or training data sets generated using other techniques can be used to train a machine learning model to predict that a robotic device will fall over. For instance, a computing device may receive data indicative of a trajectory for a robotic device, and provide the data to a machine learning model that has been trained on data sets involving robotic devices falling over. The computing device may then determine, using the machine learning model, that the trajectory of the robotic device is indicative of a potential collision (e.g., the robotic device falling over). And in response to the determining, the computing device may perform an action to avoid the potential collision. For instance, the computing device may provide an alert or alter the trajectory of the robotic device.

The description of the different advantageous arrangements has been presented for purposes of illustration and description, and is not intended to be exhaustive or limited to the examples in the form disclosed. After reviewing and understanding the foregoing disclosure, many modifications and variations will be apparent to those of ordinary skill in the art. Further, different examples may provide different advantages as compared to other examples. The example or examples selected are chosen and described in order to best explain the principles, the practical application, and to enable others of ordinary skill in the art to understand the disclosure for various examples with various modifications as are suited to the particular use contemplated.

What is claimed is:

1. A collision detection system stored on a non-transitory computer-readable storage medium, wherein the collision detection system is manufactured by a process comprising:
    obtaining a log of sensor data indicative of an environment during a prior time period, wherein the log of sensor data comprises a sequence of image frames;
    determining that the log of sensor data relates to a collision involving a physical object in the environment at a particular time within the prior time period;
    responsive to determining that the log of sensor data relates to the collision, generating a training data set for the collision from the log of sensor data, wherein the training data set for the collision comprises multiple image frames of the sequence of image frames that are prior to an image frame in the sequence of image frames that corresponds to the particular time; and
    training the collision detection system with the training data set to predict future collisions.

2. The collision detection system of claim 1, wherein determining that the log of sensor data relates to the collision comprises determining that the collision is a physical collision between the physical object and a robotic device.

3. The collision detection system of claim 2, the process further comprising obtaining accelerometer data for at least part of the prior time period, wherein determining that the log of sensor data relates to the collision comprises determining that the accelerometer data is indicative of a collision between the physical object and the robotic device.

4. The collision detection system of claim 2, the process further comprising obtaining contact sensor data for at least part of the prior time period, and wherein determining that the log of sensor data relates to the collision comprises determining that the contact sensor data is indicative of a collision between the physical object and the robotic device.

5. The collision detection system of claim 2, wherein the process is accomplished by a computing device of the robotic device.

6. The collision detection system of claim 2, wherein the log of sensor data further comprises a log of velocity data indicative of movement of the robotic device in the environment during the prior time period, and wherein generating the training data set for the collision from the log of sensor data comprises generating the training data set to further comprise at least a portion of the log of velocity data.

7. The collision detection system of claim 2, wherein the log of sensor data further comprises payload data indicative of a payload of the robotic device, and wherein determining that the log of sensor data relates to the collision comprises determining that the payload data is indicative of a collision between the physical object and the robotic device.

8. The collision detection system of claim 1, wherein determining that the log of sensor data relates to the collision comprises determining that the collision is a virtual collision between the physical object and a virtual boundary surrounding a robotic device or a virtual collision between a virtual boundary surrounding the physical object and the robotic device.

9. The collision detection system of claim 8, the process further comprising obtaining proximity sensor data for at least part of the prior time period, wherein determining that the log of sensor data relates to the collision comprises determining that the proximity sensor data is indicative of a distance between the physical object and the robotic device transitioning from being more than a threshold distance to being less than the threshold distance.

10. The collision detection system of claim 1, wherein determining that the log of sensor data relates to the collision comprises determining that the collision is a virtual collision between the physical object and a software robot in a form of an augmented reality graphic.

11. The collision detection system of claim 10, wherein at least two images of the sequence of image frames comprise depth information indicative of a distance to the physical object, and wherein determining that the log of sensor data relates to the collision comprises determining, based on the depth information, that the physical object moved from a first position to a second position and that the second position overlaps with a position of the augmented reality graphic.

12. The collision detection system of claim 1, wherein the multiple image frames comprise depth data for one or more pixels, and wherein the depth data is indicative of movement of the physical object prior to the collision.

13. The collision detection system of claim 1, wherein the environment comprises a room, wherein the log of sensor data further comprises room information indicative of a type of room of the room, and wherein generating the training data set for the collision from the log of sensor data comprises generating the training data set to further comprise the room information.

14. The collision detection system of claim 1, the process further comprising transmitting, to a machine learning server device, at least one file representing the training data set for the collision, wherein the machine learning server device is configured to train a machine learning model of the collision detection system using the training data set.

15. The collision detection system of claim 1, configured to:
receive additional sensor data indicative of the environment; and
determine that the additional sensor data is indicative of a potential collision at a future time in the environment.

16. A computer-implemented method comprising:
receiving sensor data indicative of an environment at a current time; and
determining through inputting the sensor data into a trained model whether the sensor data is indicative of a potential collision in the environment at a future time, the trained model trained according to a process comprising:
obtaining a log of sensor data indicative of another environment during a prior time period, wherein the log of sensor data comprises a sequence of image frames,
determining that the log of sensor data relates to a collision involving a physical object in the environment at a particular time within the prior time period,
responsive to determining that the log of sensor data relates to the collision, generating a training data set for the collision from the log of sensor data, wherein the training data set for the collision comprises multiple image frames of the sequence of image frames that are prior to an image frame in the sequence of image frames that corresponds to the particular time, and
training the trained model with the training data set to detect collisions.

17. The computer-implemented method of claim 16, wherein determining that the log of sensor data relates to the collision comprises determining that the collision is a physical collision between the physical object and a robotic device.

18. The computer-implemented method of claim 17, the process further comprising obtaining accelerometer data for at least part of the prior time period, wherein determining that the log of sensor data relates to the collision comprises determining that the accelerometer data is indicative of a collision between the physical object and the robotic device.

19. The computer-implemented method of claim 17, the process further comprising obtaining contact sensor data for at least part of the prior time period, and wherein determining that the log of sensor data relates to the collision comprises determining that the contact sensor data is indicative of a collision between the physical object and the robotic device.

20. The computer-implemented method of claim 17, wherein the process is accomplished by a computing device of the robotic device.

21. The computer-implemented method of claim 17, wherein the log of sensor data further comprises a log of velocity data indicative of movement of the robotic device in the other environment during the prior time period, and wherein generating the training data set for the collision from the log of sensor data comprises generating the training data set to further comprise at least a portion of the log of velocity data.

22. The computer-implemented method of claim 17, wherein the log of sensor data further comprises payload data indicative of a payload of the robotic device, and wherein determining that the log of sensor data relates to the collision comprises determining that the payload data is indicative of a collision between the physical object and the robotic device.

23. The computer-implemented method of claim 16, wherein determining that the log of sensor data relates to the collision comprises determining that the collision is a virtual collision between the physical object and a virtual boundary surrounding a robotic device or a virtual collision between a virtual boundary surrounding the physical object and the robotic device.

24. The computer-implemented method of claim 23, the process further comprising obtaining proximity sensor data for at least part of the prior time period, wherein determining that the log of sensor data relates to the collision comprises determining that the proximity sensor data is indicative of a distance between the physical object and the robotic device transitioning from being more than a threshold distance to being less than the threshold distance.

25. The computer-implemented method of claim 16, wherein determining that the log of sensor data relates to the collision comprises determining that the collision is a virtual collision between the physical object and a software robot in a form of an augmented reality graphic.

26. The computer-implemented method of claim 25, wherein at least two images of the sequence of image frames comprise depth information indicative of a distance to the physical object, and wherein determining that the log of sensor data relates to the collision comprises determining, based on the depth information, that the physical object moved from a first position to a second position and that the second position overlaps with a position of the augmented reality graphic.

27. The computer-implemented method of claim 16, wherein the multiple image frames comprise depth data for one or more pixels, and wherein the depth data is indicative of movement of the physical object prior to the collision.

28. The computer-implemented method of claim 16, wherein the other environment comprises a room, wherein the log of sensor data further comprises room information indicative of a type of room of the room, and wherein generating the training data set for the collision from the log of sensor data comprises generating the training data set to further comprise the room information.

29. The computer-implemented method of claim 16, wherein the trained model is trained as a machine learning model.

30. A non-transitory computer-readable storage medium with encoded instructions that, when executed by a processor, cause the process to accomplish steps of:
receiving sensor data indicative of an environment at a current time; and
determining through inputting the sensor data into a trained model whether the sensor data is indicative of a potential collision in the environment at a future time, the trained model trained according to a process comprising:
obtaining a log of sensor data indicative of another environment during a prior time period, wherein the log of sensor data comprises a sequence of image frames,
determining that the log of sensor data relates to a collision involving a physical object in the environment at a particular time within the prior time period,
responsive to determining that the log of sensor data relates to the collision, generating a training data set for the collision from the log of sensor data, wherein the training data set for the collision comprises multiple image frames of the sequence of image frames that are prior to an image frame in the sequence of image frames that corresponds to the particular time, and training the trained model with the training data set to detect collisions.

\* \* \* \* \*

UNITED STATES PATENT AND TRADEMARK OFFICE
CERTIFICATE OF CORRECTION

PATENT NO. : 10,384,346 B2
APPLICATION NO. : 15/699444
DATED : August 20, 2019
INVENTOR(S) : Hickman et al.

It is certified that error appears in the above-identified patent and that said Letters Patent is hereby corrected as shown below:

In the Claims

Column 16, Claim 30, Line 50, delete "process" and insert --processor--.

Signed and Sealed this
Twenty-eighth Day of April, 2020

Andrei Iancu
*Director of the United States Patent and Trademark Office*